(12) United States Patent
Coffee et al.

(10) Patent No.: US 7,376,777 B2
(45) Date of Patent: May 20, 2008

(54) PERFORMING AN N-BIT WRITE ACCESS TO AN M×N-BIT-ONLY PERIPHERAL

(75) Inventors: Clarence K. Coffee, Pembroke Pines, FL (US); Eytan Hartung, Boca Raton, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 125 days.

(21) Appl. No.: 11/233,915

(22) Filed: Sep. 23, 2005

(65) Prior Publication Data

US 2007/0073953 A1   Mar. 29, 2007

(51) Int. Cl.
*G06F 13/36*   (2006.01)
*G06F 13/12*   (2006.01)
*G06F 13/40*   (2006.01)

(52) U.S. Cl. .................. 710/306; 710/35; 710/65; 710/66; 710/307; 710/311

(58) Field of Classification Search .................. 710/35, 710/306, 307, 65, 311, 66
See application file for complete search history.

(56) References Cited

U.S. PATENT DOCUMENTS

| | | | | |
|---|---|---|---|---|
| 5,446,845 A | | 8/1995 | Arroyo et al. | 395/250 |
| 5,768,546 A | | 6/1998 | Kwon | 395/307 |
| 5,892,978 A | * | 4/1999 | Munguia et al. | 710/33 |
| 5,911,053 A | | 6/1999 | Pawlowski et al. | 395/307 |
| 6,047,120 A | | 4/2000 | Bell | 395/500.48 |
| 6,181,346 B1 | | 1/2001 | Ono et al. | 345/430 |
| 6,295,246 B2 | * | 9/2001 | Jeddeloh | 365/233 |
| 6,393,500 B1 | * | 5/2002 | Thekkath | 710/35 |
| 6,467,009 B1 | * | 10/2002 | Winegarden et al. | 710/305 |
| 6,490,642 B1 | * | 12/2002 | Thekkath et al. | 710/110 |
| 6,526,462 B1 | * | 2/2003 | Elabd | 710/242 |
| 6,571,308 B1 | * | 5/2003 | Reiss et al. | 710/315 |
| 6,601,118 B1 | | 7/2003 | Rooney | 710/56 |
| 6,742,063 B1 | | 5/2004 | Hellum et al. | 710/66 |
| 6,751,751 B1 | * | 6/2004 | Murray et al. | 714/34 |
| 6,754,741 B2 | | 6/2004 | Alexander et al. | 710/52 |
| 6,754,760 B1 | * | 6/2004 | Yee et al. | 710/307 |
| 6,829,669 B2 | * | 12/2004 | Jahnke et al. | 710/306 |
| 6,848,032 B2 | | 1/2005 | Benkual et al. | 711/146 |
| 7,043,592 B2 | * | 5/2006 | Nagano | 710/307 |
| 7,054,988 B2 | * | 5/2006 | Hils | 710/315 |
| 7,152,138 B2 | * | 12/2006 | Spencer et al. | 711/103 |
| 2001/0040633 A1 | | 11/2001 | Yang | 348/302 |
| 2003/0217218 A1 | | 11/2003 | Gaidukov | 710/307 |

(Continued)

*Primary Examiner*—Paul R. Myers
*Assistant Examiner*—Christopher Daley

(57) ABSTRACT

A system-on-chip (100) includes a 16-bit DSP (102), a 16-bit data bus (202) coupled to the DSP, at least one 32-bit-only peripheral (110), a 32-bit data bus (212) coupled to the peripheral, and a bridge (108), including a write merge system (200), coupled between the 16-bit and 32-bit buses. A method of the write merge system includes pre-storing addresses of peripherals in a memory map structure (220 and 221), receiving 16-bit data and a write transaction from the DSP for modifying sixteen bits of a 32-bit data location of the peripheral; reading 32-bit contents of the data location of the peripheral; multiplexing the received 16-bit data with the read 32-bit contents; and writing a new 32-bit word, including the modified sixteen bits and an unmodified sixteen bits, to the data location of the peripheral, without any intervention from the DSP subsequent to receiving the write transaction.

20 Claims, 7 Drawing Sheets

U.S. PATENT DOCUMENTS

| | | | |
|---|---|---|---|
| 2003/0221038 A1 | 11/2003 | Yoo et al. | 710/305 |
| 2004/0268042 A1 | 12/2004 | Okada et al. | 711/115 |
| 2005/0240706 A1* | 10/2005 | Tsai | 710/306 |
| 2006/0047882 A1* | 3/2006 | Kawaguchi | 710/315 |

* cited by examiner

PERFORMING AN N-BIT WRITE ACCESS TO AN M×N-BIT-ONLY PERIPHERAL

BACKGROUND OF THE INVENTION

1. Field of the Invention

This invention generally relates to intrasystem connections of electrical computers, and more particularly to an interface architecture for a bus bridge between busses of different data widths.

2. Description of the Related Art

When a Digital Signal Processor (DSP) is the only processor of a computer system such as a System-on-Chip, the DSP must perform both control and signal processing functions. As part of its control function, a 16-bit DSP is required, at times, to perform write accesses to a 32-bit input/output device, or peripheral, that only allows 32-bit write accesses. The 16-bit DSP is coupled to the 32-bit-only peripheral by a bridge. In a conventional programming model, DSP firmware or software is required to perform two entire 16-bit write operations to the peripheral in order to correctly write control data to the 32-bit-only peripheral. Meeting this requirement disadvantageously increases software overhead and reduces the performance of the DSP when executing application code to the peripheral.

Such known conventional write accesses are accomplished by the DSP firmware or software performing the sequence of a) read, b) modify and c) write. Disadvantageously, all known methods require an N-bit DSP to perform the foregoing sequence twice, which, for a two-cycle access DSP, totals to two read cycles and two write cycles, in order to modify the data at a single 2N-bit location of a peripheral. The resulting write access to the peripheral using prior art techniques is inefficient with respect to processor task management, in that a single write access requires four (4) DSP instructions of reading or writing. Using known methods and apparatus, each occasion that the 16-bit, two-cycle access DSP writes to the 32-bit-only peripheral disadvantageously uses at least eight (8) clock cycles of the DSP.

For example, assume a computer system includes a two-cycle access 16-bit DSP and a 32-bit-only peripheral, and that it is pre-determined that a data location having DSP address "0" coincides with a low sixteen (16) bits of a 32-bit data location of the 32-bit-only peripheral and that a data location having DSP address "1" coincides with a high sixteen (16) bits of the 32-bit data location of the 32-bit-only peripheral. If the 16-bit DSP writes to the 32-bit-only peripheral in order to modify the high sixteen (16) bits of the 32-bit data location, such as at peripheral address "1", the following disadvantageously large number of operations would be needed: a) the DSP performs a 16-bit read at address "0"; however, such read data is not returned to the DSP until the bridge completes the next operation, which stalls the DSP, thereby effectively adding additional clock cycles to the at least eight (8) clock cycles of the DSP time; b) a 32-bit read from the peripheral is performed by the bridge at address "0" of the 32-bit-only peripheral; c) the DSP performs a 16-bit read at address "1"; d) within the internal registers of the DSP, the contents of the 16-bit word at address "1" is modified; e) the DSP performs a 16-bit write at address "0"; f) the DSP performs a 16-bit write at address "1"; and g) a 32-bit write at address "0" is performed by the bridge on the 32-bit-only peripheral.

In the case of the 16-bit DSP modifying sixteen (16) bits of a 32-bit register, a total of six (6) operations are needed, two (2) DSP reads, two (2) DSP writes, one (1) bridge read and one (1) bridge write. Each read operation of the DSP requires a number of clock cycles that depends upon a ratio between a speed of a clock for a DSP bus and a usually slower speed of a clock for a peripheral bus. Each write operation of the DSP is executed at the speed of the DSP bus because data is usually written to a temporary buffer on the bridge.

DETAILED DESCRIPTION OF THE PREFERRED EMBODIMENT

Figure 1:
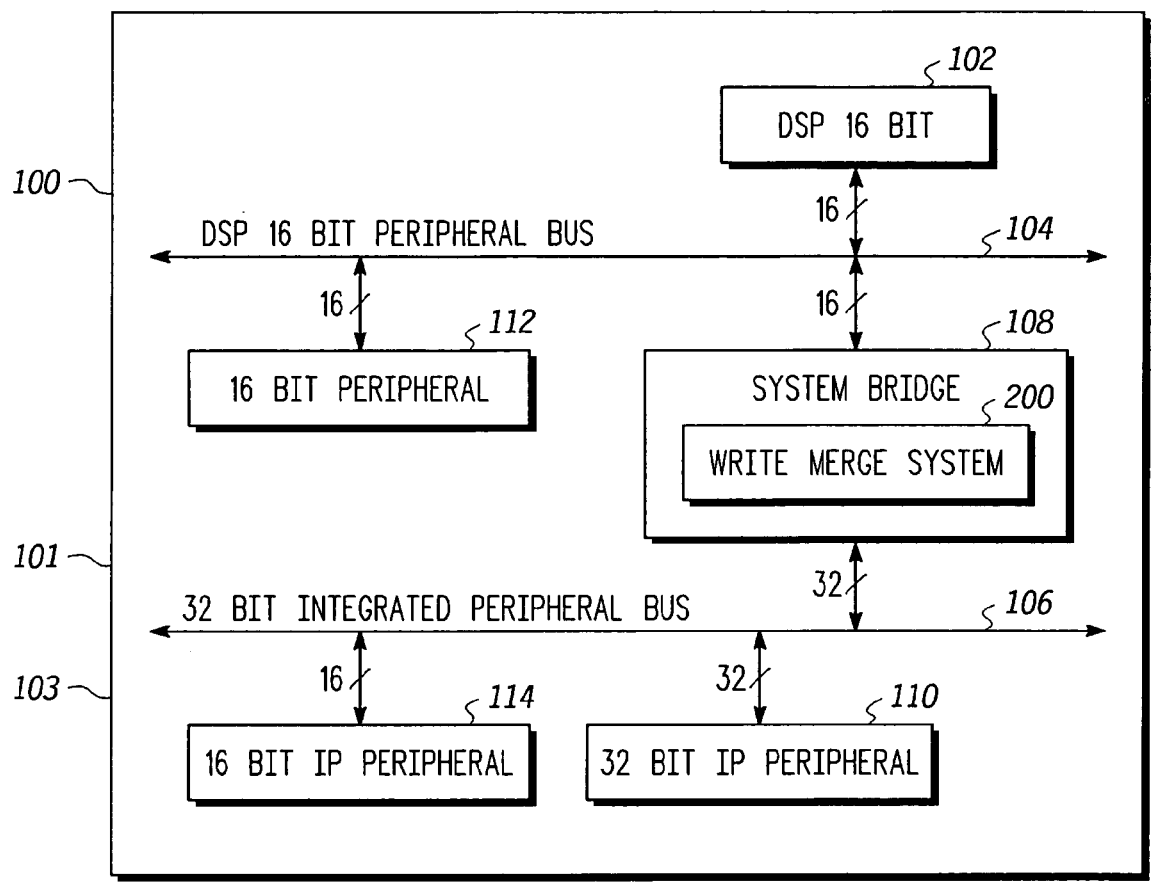
FIG. 1 is a functional block diagram of a System-on-Chip, including a system bridge and a write merge system in accordance with one embodiment of the invention.

Referring to FIG. 1, a System-on-Chip (SoC) 100 comprises at least one processor, including at least one two-cycle access 16-bit DSP 102. It should be noted that the SoC 100 does not include a 32-bit processor. A typical use of the SoC 100 is as a component of an Industrial, Scientific and Medical (ISM) band radio transceiver. Preferably, the DSP 102 is a DSP with an ONYX™ core, used in each of the DSP566xx family of products, manufactured by Freescale Semiconductor, Inc., of Austin, Tex. The SoC 100 comprises a 16-bit DSP bus 104, a 32-bit Integrated Peripheral (IP) bus 106, a bridge 108 coupling the 16-bit DSP bus 104 to the 32-bit IP bus 106, and at least one 32-bit-only peripheral 110 coupled to the IP bus. By the term "16-bit DSP" it is meant a DSP in which the width of the x and y data paths, used for input/output peripherals and data memory access, is sixteen (16) bits; however, the width of the instruction data path, used primarily for memory, may be other than sixteen (16) bits. By the term "32-bit-only" it is meant that the peripheral accepts only 32-bit data and does not accept 16-bit data. The SoC 100 may also comprise a 16-bit peripheral 112 coupled to the DSP bus 104 and another 16-bit peripheral 114 coupled to the IP bus 106. The at least one 32-bit-only peripheral 110 may have been migrated from a SoC (not shown) that included a 16-bit DSP for signal processing functions and a 32-bit processor for control functions. Advantageously, the invention allows such migrated 32-bit-only peripherals to be used without modifying their designs. Without a 32-bit processor, the 16-bit DSP 102 is required to perform control, as well as signal processing, functions on the SoC. As part of the control functionality, the DSP 102 may be required to write 16-bit control data to the 32-bit-only peripheral 110. To do this coherently, and without multi-cycle writes controlled by software, the bridge 108 in accordance with the invention accepts 16-bit data from the DSP 102 and writes the 16-bit data to the 32-bit-only peripheral 110 without corrupting the other sixteen (16) bits of the 32-bit data not being accessed by the DSP. The DSP 102, the bridge 108, the DSP bus 104, the IP bus 106 and the peripherals 110, 112 and 114 are on a circuit-supporting wafer substrate 103 of a single integrated circuit 101 of the SoC 100. Alternatively, a portion of the 32-bit bus also exists external to the integrated circuit 101 of the SoC 100, and at least one 32-bit-only peripheral 110 resides off the SoC 100. The SoC 100 may also comprise a 32-bit peripheral (not shown) that does accept 16-bit data.

The bridge 108 in accordance with the invention includes a write merge system 200. The write merge system 200 comprises, and preferably is composed of, hardware. In a preferred embodiment, the hardware includes hard-wired, synchronous and non-synchronous, combinatorial and sequential logic circuits, but does not include a processor. In the preferred embodiment, the write merge system 200 does not include any firmware or software. An advantage of not using any processor, firmware or software as part of the write merge system 200 is a higher speed of execution. In an alternative embodiment, the hardware of the write merge system 200 includes a processor (separate from the DSP 102) and software or firmware. In both the preferred and alternative embodiments, another advantage of the write merge system 200 includes off-loading of the work of the DSP 102 to the write merge system. In one embodiment, the write merge system 200 may be designed by persons of ordinary skill in the art of digital circuits using complementary metal oxide semiconductor (CMOS) logic, and may be manufactured by persons of ordinary skill in the art of semiconductor fabrication using CMOS manufacturing technology.

The write merge system 200 converts a single 16-bit write by the DSP 102 into a single 32-bit write to the 32-bit-only peripheral 110. A prior art bridge (not shown) between a 16-bit bus and a 32-bit bus lacks the write merge system 200 as described herein, and cannot convert a single 16-bit write by the DSP 102 into a single 32-bit write to the 32-bit-only peripheral 110. The bridge 108 also performs functions, such as the changing hardware control signals between 32-bits and 16-bits, and such as permitting the 16-bit DSP to perform reads from all the peripherals. Preferably, one or more portions of the bridge 108, other than the write merge system 200, are used when there is a need to modify both the upper and the lower 16-bit portions of a 32-bit location of a peripheral. Alternatively, the write merge system 200 portion of the bridge 108 is used to modify both the upper and the lower 16-bit portions of a 32-bit location of a peripheral. Preferably, one or more portions of the bridge 108 other than the write merge system 200 are used when there is a need to write to the 16-bit peripheral 114 coupled to the 32-bit bus 106. Alternatively, the write merge system 200 is used to write to the 16-bit peripheral 114 coupled to the 32-bit bus 106.

Figure 2:
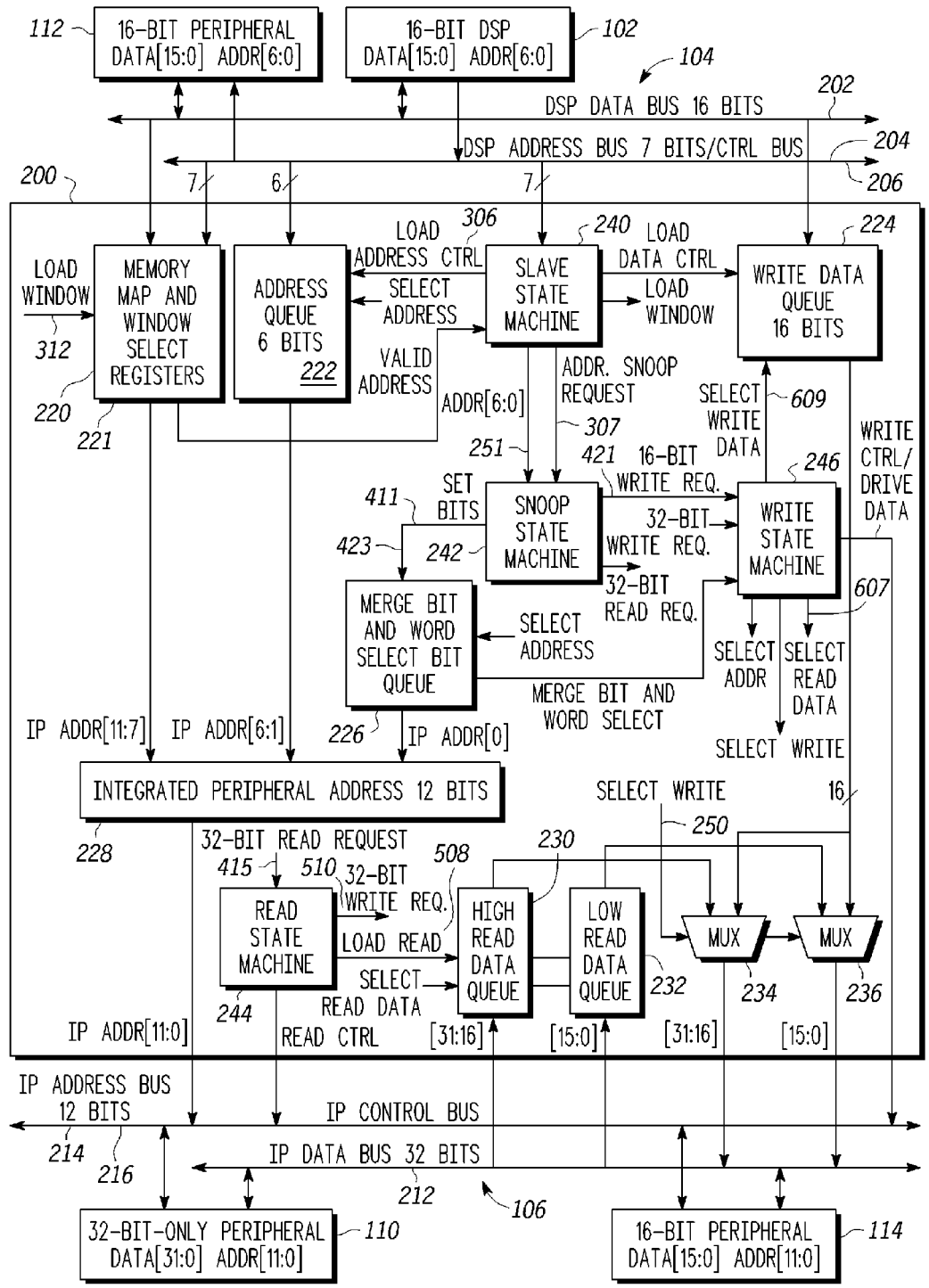
FIG. 2 is a functional block diagram of the write merge system in accordance with one embodiment of the invention.

Referring to FIG. 2, a functional block diagram of the write merge system 200 is shown. The DSP bus 104 comprises a 16-bit DSP data bus 202, a 7-bit DSP address bus 204 and a DSP control bus 206. For simplicity of illustration, the address bus 204 and the control bus 206 are shown as one. The IP bus 106 comprises a 32-bit IP data bus 212, a 12-bit IP address bus 214 and an IP control bus 216. For simplicity of illustration, the IP address bus 214 and the IP control bus 216 are shown as one. The write merge system 200 comprises a memory map 220, which is a decode and memory structure in which is pre-stored a memory map of address ranges that correspond to the addresses of all the peripherals (32-bit-only, 32-bit, 16-bit, etc.) on the IP bus 106. The write merge system 200 comprises five (5) window select registers 221 in which are pre-stored five (5) bits associated with each address range. A function of the window select registers 221 is to expand the addressable address range of the DSP 102. In accordance with the invention, the contents of the five (5) window select registers 221 become the five (5) most significant bits of the 12-bit address of a peripheral. The write merge system 200 uses the window select registers 221 in the following manner. The 5-bit output of the window select registers 221 is driven directly onto the IP address bus 214 during a read address phase 818 (see FIG. 8) of a read cycle of the IP bus 106 or during a write address phase 822 (see FIG. 8) of a write cycle of the. IP bus. This allows the DSP 102 to expand its address range from hexadecimal "00-7F" to hexadecimal "000- FFF", and allows the mapping of more peripherals into a DSP system address map. The write merge system 200 comprises an address queue 222, or an ordered first-in, first-out memory structure that sequentially provides the addresses to which the DSP 102 is performing a write operation. The addresses stored in the address queue 222 have a width of six (6) bits, which are the six (6) most significant bits of a 7-bit DSP address. The write merge system 200 also comprises a write data queue 224, or an ordered first-in, first-out memory structure that sequentially provides the data that the DSP 102 is writing to a peripheral on the IP bus 106. The data stored in the write data queue 224 have a width of sixteen (16) bits.

For every entry in the address queue 222 there is one (1) merge bit and one (1) word select bit. A function of the merge bit is to determine the necessity of a merge during the next write cycle of the IP bus 106, as more fully explained hereinafter. If the merge bit is set to an arbitrary value of "1", a merge occurs. If the merge bit is set to an arbitrary value of "0", a merge does not occur. If the least significant bit of an address of a 16-bit word is "0", then the word select bit has an arbitrary value of "0", and the write merge system 200 causes a 16-bit write to a lower sixteen (16) bits of a 32-bit word. If the least significant bit of an address of a 16-bit word is "1", then the word select bit has an arbitrary value of "1", and the write merge system 200 causes a 16-bit write to an upper sixteen (16) bits of a 32-bit word. When it is writing to a 16-bit peripheral 114 on the 32-bit IP bus 106, the write merge system 200 performs a write operation, without merging.

The write merge system 200 includes a merge bit and word select bit queue 226. For every entry in the address queue 222 and in the write data queue 224 there is a single entry in the merge bit and word select bit queue 226, and the three (3) queues advance in unison. The merge bit and word select bit queue 226 is a single queue of 2-bit values formed from a table (not shown) based upon a location of a target register in the memory map 220 and whether or nor the target register can be merged, and based upon a current DSP write address.

The write merge system 200 includes an IP address buffer 228 that is a memory structure that has a width of twelve (12) bits, which holds an address of a peripheral on the IP bus 106 that is currently being accessed. The write merge system 200 also includes a high read data queue 230 and a low read data queue 232. The high read data queue 230 holds an upper sixteen (16) bits, i.e., bits 16-31, of a 32-bit word. Concurrently, the low read data queue 232 holds a lower sixteen (16) bits, i.e., bits 0-15, of the same 32-bit word. The write merge system 200 also includes two multiplexers 234 and 236. The write merge system 200 comprises a slave state machine 240, a snoop state machine 242, a read state machine 244, and a write state machine 246. The slave state machine 240 and the snoop state machine 242 respond to activity on the DSP bus 104. The read state machine 244 and the write state machine 246 initiate read cycles and write cycles, respectively, on the IP bus 106. The slave state machine 240, the snoop state machine 242, the read state machine 244, and the write state machine 246 are used for control and timing of the activity of the write merge system 200.

Figure 3:
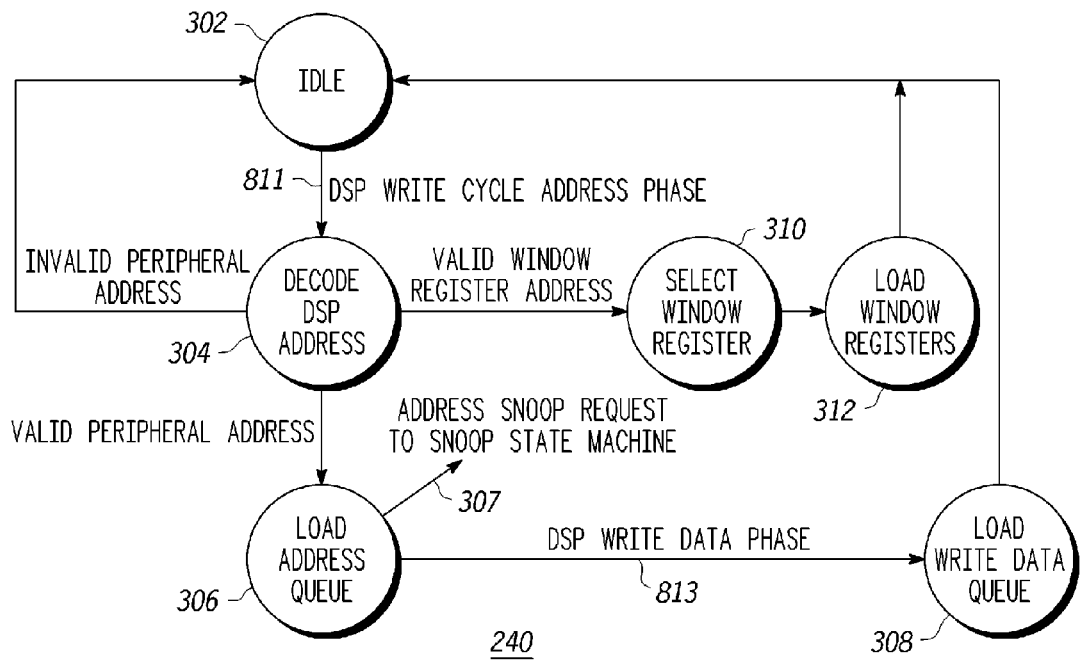
FIG. 3 is a state diagram of a slave state machine of the write merge system.

FIG. 3 is a state diagram of the slave state machine 240 showing actions by the slave state machine and transitory conditions internal thereto. The slave state machine 240 is at idle at state 302. During a write address phase 811 (see FIG. 8) of a write cycle of the DSP bus 104, the slave state machine 240 decodes, at state 304, the address on the DSP bus. If the address is invalid, that is, if the address decoded does not correspond to one of the addresses of the peripherals on the IP bus 106, the slave state machine 240 returns to the idle state 302. On the other hand, if the address is valid, that is, if the address decoded corresponds to one of the addresses of the peripherals on the IP bus 106, the slave state machine 240 loads, at state 306, the address into the address queue 222, performs an action of responding to a snoop request 307 this address to the snoop state machine 242, and, during an associated write data phase 813 (see FIG. 8) of a write cycle of the DSP bus 104, loads 308 the associated data into the write data queue 224. Then, the slave state machine 240 returns to the idle state 302. When the DSP 102 executes a write access to the window select registers 221, the slave state machine 240 selects, during a select window register state 310, the current contents of the window select registers during the write data phase 813 on the DSP bus 104. The slave state machine 240 loads, during a load window register state 312, the window select registers 221. Then, the slave state machine 240 returns to the idle state 302. Prior to reading or writing to the IP bus 106, the DSP 102 first pre-configures the window map array to point to the proper peripheral window. The DSP 102 programs the window select registers 221 as part of a configuration sequence when the DSP needs to access a group of peripherals that resides in an address range beyond a DSP address range of hexadecimal "00-7F" that is allocated to the peripherals.

Figure 4:
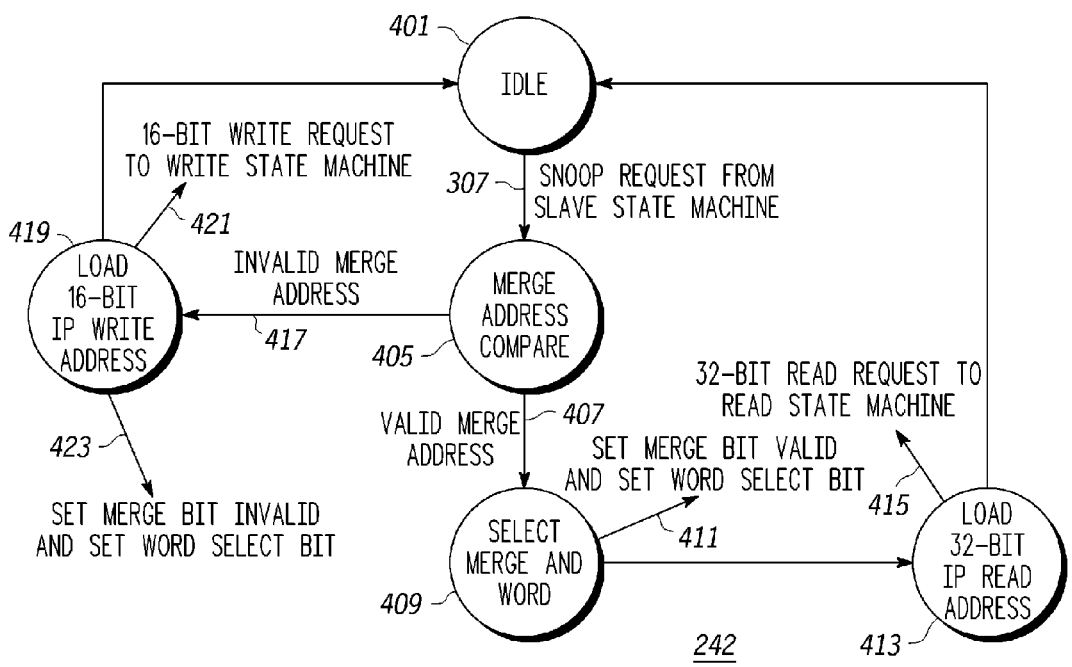
FIG. 4 is a state diagram of a snoop state machine of the write merge system.

FIG. 4 is a state diagram of the snoop state machine 242 showing actions by the snoop state machine and internal transitory conditions. The snoop state machine 242 is at idle at state 401. The snoop request 307 acts as a transitory condition in the snoop state machine 242. The snoop request 307 is issued to the snoop state machine 242 with the seven (7) bit DSP address 251, which transitions the snoop state machine from the idle state 401 to the merge address compare state 405. At state 405, the snoop state machine compares the current address on the DSP address bus 204 to addresses of peripherals known to be coupled to the IP bus 106. Such peripherals may be of one of a 16-bit peripheral, a 32-bit peripheral and a 32-bit-only peripheral, which addresses are pre-stored in the memory map 220.

If the address corresponds to an address of a 32-bit-only peripheral that allows merging, the address is considered a valid merge address 407, and the write merge system 200 builds a 32-bit IP address, and enters a select merge and word state 409. The snoop state machine 242 sets 411 the merge bit. The snoop state machine 242 sets 411 the merge bit to the value of "1" to indicate that a merge (of 16-bit portions of a 32-bit word) shall be executed by the write merge system 200. The snoop state machine 242 also sets 411 the word select bit. The value of the word select bit is either "1" or "0", based on a value of a least significant bit of the DSP address. The snoop state machine 242 sets 411 the word select bit to either an arbitrary value of "1" to indicate whether the data that is being changed is within an upper sixteen (16) bits of the 32-bit word, or to an arbitrary value of "0" to indicate whether the data that is being changed is within a lower sixteen (16) bits of the 32-bit word.

If the address is a valid merge address 407, prior to entering a load 32-bit IP read address state 413, the write merge system 200 builds an IP address. The IP address is built from a concatenation of the five (5) window select registers 221 output bits, the six (6) bits from the address queue 222, and one (1) least significant bit that is the result of the merge bit and the DSP address bit 0. For example, if the least significant bit of the DSP address is "1", and if the merge bit is "1", then, as a result, the least significant bit of the IP address is changed to "0". There is a need to build the IP address because the 32-bit-only peripheral 110 has an address that has a size of twelve (12) bits, and the DSP 102 is attempting to access the peripheral using an address that has a size of seven (7) bits. Next, the snoop state machine 242 enters the load 32-bit read address state 413. The snoop state machine 242 initiates a 32-bit read request 415 to the read state machine 244.

Referring again to the merge address compare state 405, if the address corresponds to an address of a 16-bit peripheral 114 coupled to the 32-bit IP bus, the address is considered an invalid merge address 417. Next, the snoop state machine 242 enters a load 16-bit IP write address state 419. The snoop state machine 242 clears 423 the merge bit, i.e., the merge bit value becomes "0", to indicate that a merge shall not be executed by the write merge system 200 because a merge is not required. Because the address is an invalid merge address 417, no merge is required and there is no need to build a modified IP address prior to loading the IP address. The write merge system 200 loads the IP address for the 16-bit peripheral 114 that is being accessed for a write operation. The snoop state machine 242 initiates a 16-bit write request 421 to the write state machine 246.

Figure 5:
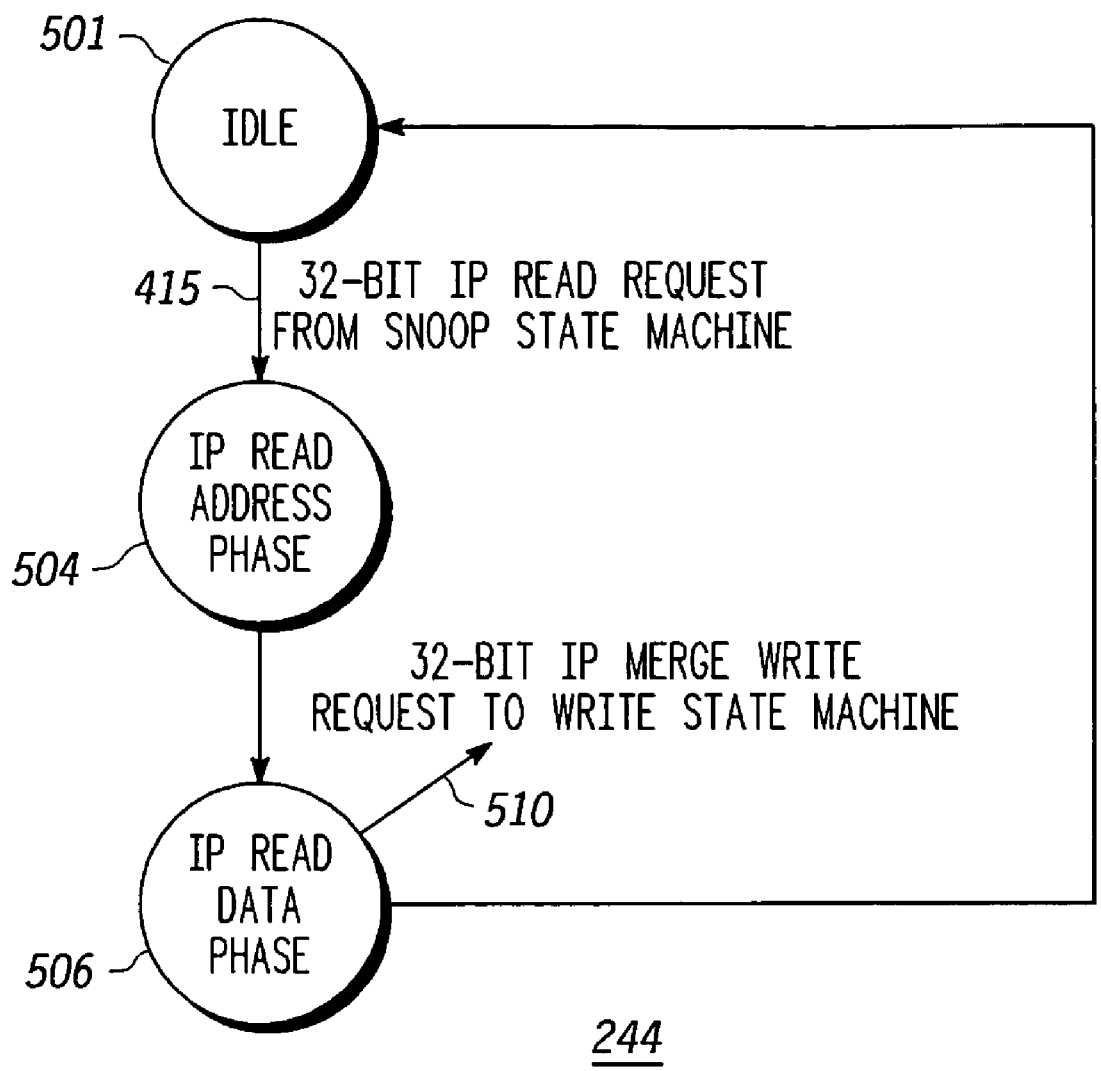
FIG. 5 is a state diagram of a read state machine of the write merge system.

FIG. 5 is a state diagram of the read state machine 244 showing actions produced by the read state machine and transitory conditions internal to the read state machine. The read state machine 244 is at idle at state 501. The 32-bit read request 415 initiated by the snoop state machine 242 acts as a transitory condition in the read state machine 244, and produces an action by the read state machine 244 of reading 504, during the read address phase 818 of the IP bus 106, the address of a 32-bit word of the 32-bit-only peripheral to which the DSP 102 is attempting to modify only sixteen (16) bits. Thereafter, at state 506, the read state machine 244 performs an action of reading, during a read data phase 819 (see FIG. 8) of a read cycle of the IP bus 106, the contents from the address of the 32-bit word of the 32-bit-only peripheral to which the DSP 102 is attempting to modify sixteen (16) bits. At state 506, the read state machine 244 also performs an action of loading the contents from the address into the high read data queue 230 and into the low read data queue 232. The upper bits (bits 31-16) of the contents are loaded into the high read data queue 230. The lower bits (bits 15-0) of the contents are loaded into the low read data queue 232. The read state machine 244 also initiates a 32-bit merge write request 510 to the write state machine 246.

Figure 6:
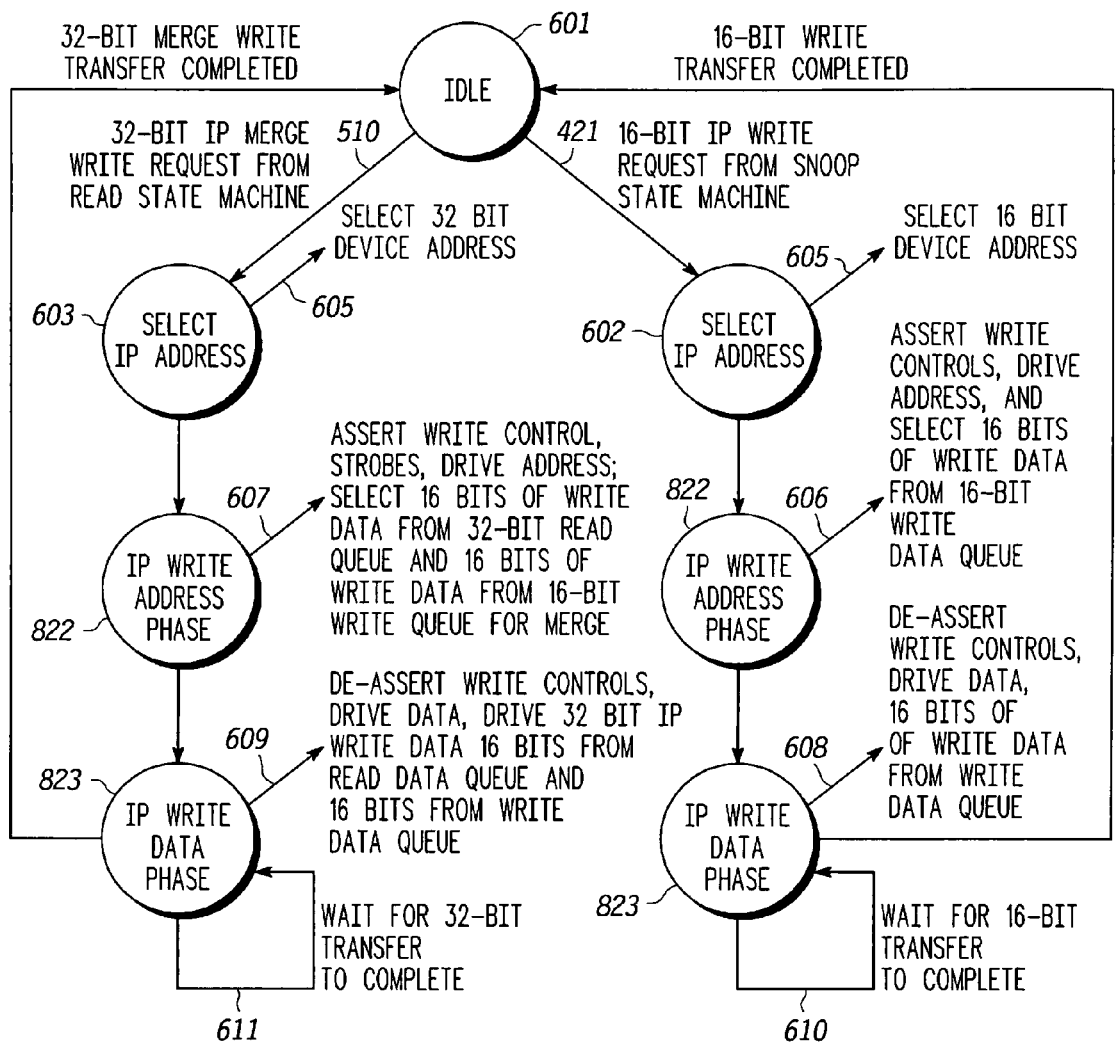
FIG. 6 is a state diagram of a write slave state machine of the write merge system.

FIG. 6 is a state diagram of the write state machine 246 showing actions performed by the write state machine and transitory conditions that occur therein. The write state machine 246 is at idle at state 601. For each write access of the write merge system 200, the write state machine 246 receives either the 16-bit write request 421 from the snoop state machine 242 or the 32-bit merge write request 510 from the read state machine 244, each of which produces a different transitory condition in the write state machine.

In the case that the write state machine 246 receives the 32-bit merge write request 510 from the read state machine 244, the write state machine performs, at state 603, an action of selecting 605 the address of a target register of a target peripheral, i.e., the 32-bit-only peripheral 110 to which the write is directed. During the write address phase 822 of the IP bus 106, the write state machine 246 performs an action of driving 607 the 12-bit address of the 32-bit-only peripheral 110 on the IP address bus 214. At this time, the write state machine 246 also asserts a write control signal 809 (see FIG. 8) onto the IP bus 106. At this time, the write state machine 246 also performs an action of selecting the read data queue. The thirty-two (32) bits of output data from the read data queues 230 and 232 are placed on inputs of the multiplexers 234 and 236. The sixteen (16) bits of data from the high read data queue 230 are placed on the inputs of multiplexer 234, and the sixteen (16) bits of data from the low read data queue 232 are placed on the inputs of multiplexer 236. At this time, the write state machine 246 also performs an action of selecting the write data queue, and the sixteen (16) bits of output data from the write data queue 224 are placed on inputs of each of the multiplexers 234 and 236. The write state machine 246 de-asserts 609 the write control signal 809 onto the IP bus 106, and, during a write data phase 823 (see FIG. 8) of a write cycle of the IP bus 106, drives thirty-two (32) bits of data from the multiplexers 234 and 236 onto the IP data bus 212, i.e., sixteen (16) bits of the data from each of the two multiplexers. The output from multiplexer 234 is composed of sixteen (16) bits of data from either the write data queue 224 or sixteen (16) bits of data from the high read data queue 230, depending upon a select write signal 250 from the write state machine 246. The output from multiplexer 236 is composed of sixteen (16) bits of data from either the write data queue 224 or sixteen (16) bits of data from the low read data queue 232, depending upon the select write signal 250 from the write state machine 246. In the case where the 32-bit-only peripheral 110 requests a wait state because it is not ready, the IP write state machine 246 waits 611 for the 32-bit transfer to complete.

In the case that the write state machine 246 receives the 16-bit write request 421 from the snoop state machine 242, the write state machine performs, at state 602, an action of selecting 604 the address of the IP-bus 16-bit peripheral 114 to which the write is directed. During the write address phase 822 of the IP bus 106, the write state machine drives 606 the 12-bit address of the 16-bit peripheral 114 onto the IP address bus 214. At this time, the write state machine 246 also performs an action of selecting the write data queue, and the sixteen (16) bits of data from the write data queue 224 are placed on the inputs of multiplexer 234 and on the inputs of multiplexer 236. During the write data phase 823 of the IP bus 106, the write state machine 246 drives 608 sixteen (16) bits of data from one of the multiplexers 234 and 236 onto the IP data bus 212. In the case where the IP-bus 16-bit peripheral 114 requests a wait state, the write state machine 246 waits 610 for the 16-bit transfer to complete.

Figure 7:
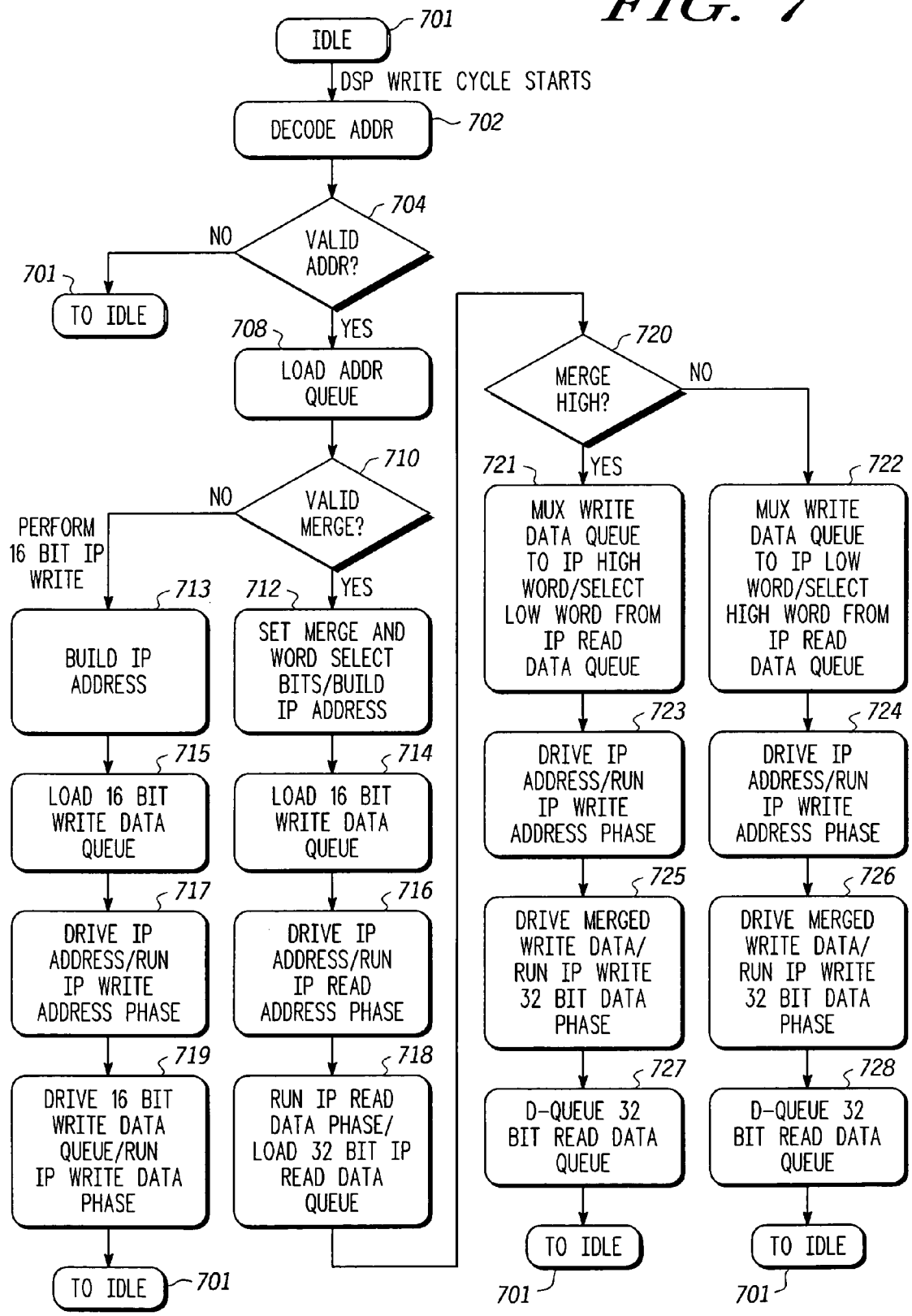
FIG. 7 is a flow diagram showing operational steps of the write merge system.

FIG. 7 is a flow diagram showing operational steps of the write merge system 200. The write merge system 200 is at idle at state 701. The write merge system 200 first decodes, at step 702, an address of a peripheral to which the DSP 102 is writing, i.e., a write target. The write merge system 200 next determines, at step 704, whether the address of the peripheral that is the write target is also the address of a peripheral on the IP bus 106. If the determination is made in the affirmative, the write merge system 200 stores, at step 708, the destination address from the DSP 102 in the address queue 222. If, at step 704, the determination is made in the negative, the write merge system 200 goes to the idle state 701. The write merge system 200 determines, at step 710, whether the address of the peripheral that is the write target is the address of a peripheral that can only accept 32-bit writes, such as peripheral 110 that requires a merge, or is the address of a peripheral that does not require a merge.

If a merge is required, then, at step 712, the write merge system 200 sets the merge bit and sets the word select bit appropriately, and builds a 12-bit IP address for the target peripheral from a 7-bit DSP address of the target peripheral, from the contents of the window select registers 221 and from contents of the merge bit and word select bit queue 226. At step 714, the write merge system 200 loads the write data queue 224 with the new sixteen (16) bits of data from the DSP data bus 202. At step 716, the write merge system 200 drives the 12-bit address, and runs the read address phase 818. At step 718, the write merge system 200 performs a 32-bit read from the 32-bit-only peripheral 110, and loads the high read data queue 230 and low read data queue 232 with the 32-bit data captured from the IP data bus 212 during the read data phase 819. At step 720, a determination is made whether the high or the low sixteen (16) bits of the 32-bit data in the read data queues 230 and 232 shall be merged, with the new destination data stored in the write data queue 224. By the term "merged" it is meant that old data is overwritten by, and replaced by, new data. In the present exemplary embodiment, one 16-bit word of a 32-bit word is replaced by a 16-bit word of new data. The other 16-bit word of the 32-bit word is not replaced or otherwise changed by the new data, and remains old data, and is advantageously not corrupted or otherwise adversely affected by the merge operation. The 32-bit read, at state 506, includes sixteen (16) bits from the 32-bit-only peripheral 110 that will be modified plus sixteen (16) bits that will not be modified. The sixteen (16) bits that will not be modified are either the lower or upper sixteen (16) bits, depending upon the destination address.

Assuming that the determination is made that the low sixteen (16) bits shall be merged with the new destination data, the new destination data in the write data queue is selected as the output of multiplexer 236 for the low IP word, and the current data in the 32-bit-only peripheral 110, captured in the high read queue 230, is selected as the output of multiplexer 234 for the high IP word, at step 722. A new 32-bit word is thereby produced. Next, at step 724, the write merge system 200 drives the 12-bit address from the IP address buffer 228, and runs the write address phase 822. At step 726, the write merge system 200 drives data from the multiplexers 234 and 236 onto the IP bus, which data includes the 16-bit data from the write data queue 224, and the write merge system runs the write data phase 823, thereby writing the new 32-bit word to the 32-bit-only peripheral 110. At step 728, the write merge system de-queues the 32-bit data from the read data queues 230 and 232. Then, the write merge system 200 returns to the idle state 701. In the process, the DSP 102 performs a single 16-bit write cycle to access a 32-bit-only peripheral 110. Therefore, the write merge system 200 receives 16-bit data from the DSP 102 for modifying a 16-bit word of the 32-bit-only peripheral 110, and in response, the write merge system provides a 12-bit address, and writes the data to the 32-bit-only peripheral without further software intervention by the processor.

On the other hand, if the determination is made, at step 720, that the high sixteen (16) bits shall be merged, the steps that the write merge system executes steps 721, 723, 725 and 727, as shown in the flow diagram of FIG. 7, which follow a similar pattern to that already described.

On the other hand, if the write merge system 200 determines, at step 710, that the address of the peripheral that is the write target is the address of a peripheral that does not require a merge, then, the write merge system builds, at step 713, a 12-bit IP address for the target peripheral from its 7-bit DSP address and from the contents of the window select registers 221. At step 715, the write merge system 200 loads the write data queue 224 with the new sixteen (16) bits of data from the DSP data bus 202. At step 717, the write merge system 200 drives the 12-bit address from the IP address buffer 228, and runs the IP write address phase. At step 719, the write merge system 200 fetches the 16-bit data from the write data queue 224, runs the IP write data phase and writes the new 16-bit word to the 16-bit peripheral 114. Then, the write merge system 200 returns to the idle state 701.

Figure 8:
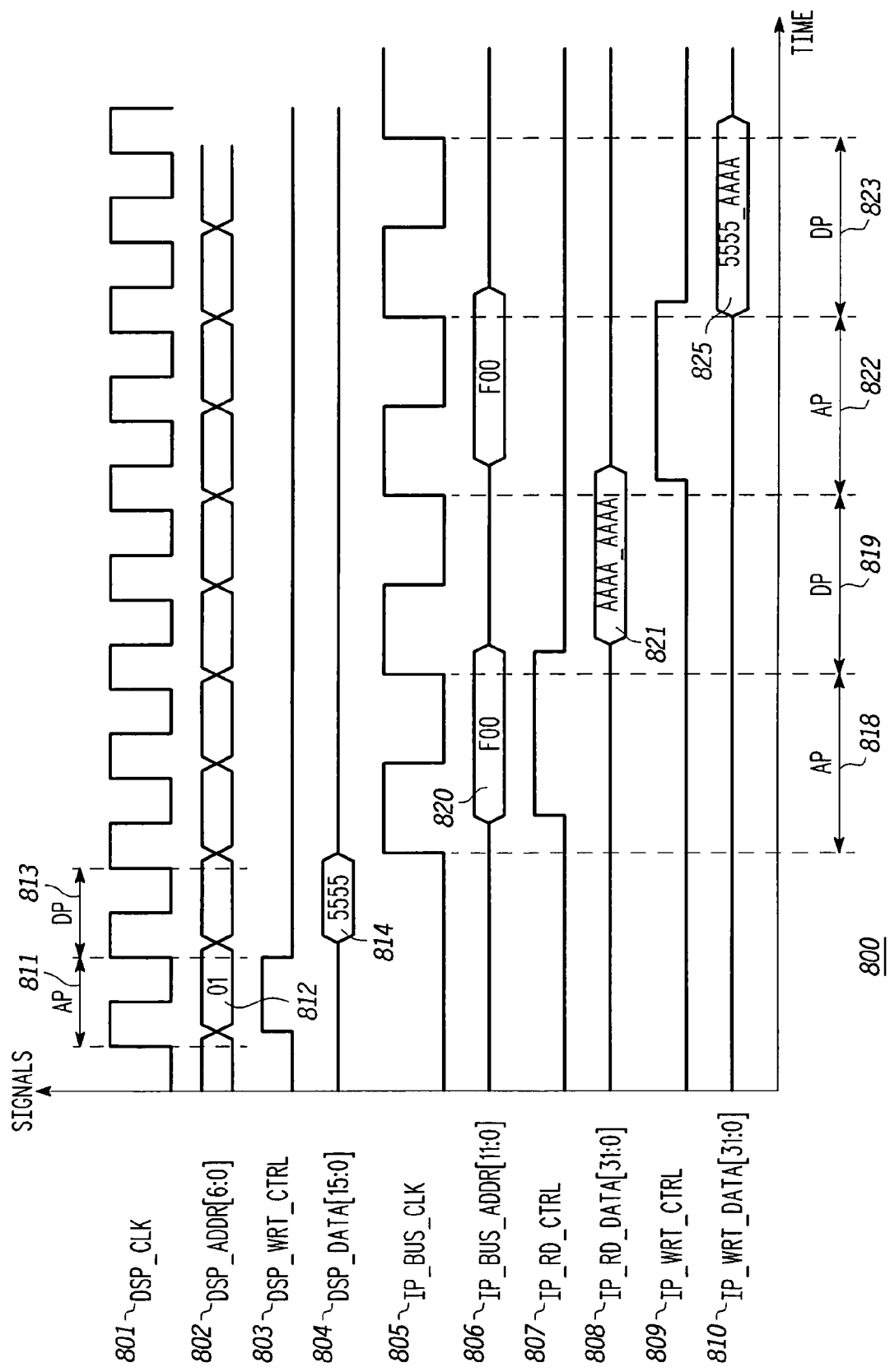
FIG. 8 is a timing diagram of the write merge system.

FIG. 8 is a timing diagram 800 of the write merge system 200. Typically, the clock speed 801 of the DSP bus 104 is faster than the clock speed 805 of the IP bus 106. In the typical use of the SoC 100 as a component of an ISM band radio transceiver, the DSP bus 104 operates at a clock speed of 133 MHz and the IP bus 106 operates at a clock speed of 16-32 MHz. The write merge system 200 in accordance with the invention is not limited to situations where the clock speed of the DSP bus 104 is faster than the clock speed of the IP bus 106, but can be used where the clock speed of the DSP bus is slower than the clock speed of the IP bus, and can be used where the clock speed of the DSP bus and the clock speed of the IP bus are the same.

During the write address phase 811 of the 16-bit DSP bus 104, the DSP 102 writes an exemplary 7-bit address 812 (shown as a signal 802) onto the DSP address bus 204. The exemplary 7-bit address is "0000001" in binary (indicated as "01" in hexadecimal in FIG. 8). The exemplary address 812 is chosen for pedagogical purposes to correspond to the address of an upper sixteen (16) bits of a 32-bit data location of a 32-bit-only peripheral. The DSP 102 asserts a write control signal 803 on the DSP control bus 206. During the write data phase 813 of the DSP bus 104, the DSP 102 writes exemplary data 814 (shown as a signal 804) onto the DSP data bus 202. The exemplary data 814 is a 16-bit word ("5555" in hexadecimal).

During the read address phase 818 of the 32-bit IP bus 106, the write merge system 200 drives an exemplary 12-bit address 820 (shown in FIG. 8 as a signal 806) onto the IP address bus 214. The exemplary address 820 is indicated as "F00" in hexadecimal in FIG. 8, and has a width of twelve (12) bits. The exemplary address 820 corresponds to a 32-bit data location of a 32-bit-only peripheral, which encompasses the exemplary 7-bit address 812 and a current setting of the window select registers 221 of "1E" in hexadecimal. The write merge system 200 asserts a read control signal 807 on the IP control bus 216. During the read data phase 819 of the IP bus 106, the write merge system 200 reads exemplary data 821 (shown as a signal 808) from the IP data bus 212. The exemplary data 821 is a 32-bit word ("AAAA AAAA" in hexadecimal). During the write address phase 822 of the 32-bit IP bus 106, the write merge system 200 drives the exemplary 12-bit address 820 onto the IP address bus 214. The write merge system 200 asserts a write control signal 809 on the IP control bus 216. During the write data phase 823 of the IP bus 106, the write merge system 200 writes modified exemplary data 825 (shown as a signal 810) to the IP data bus 212. The modified exemplary data 825 is a 32-bit word ("5555 AAAA" in hexadecimal). The modified exemplary data 825 is the original 32-bit word ("AAAA AAAA" in hexadecimal) merged with the new 16-bit word ("5555" in hexadecimal), in which the upper sixteen (16) bits of the original 32-bit word are replaced by the new 16-bit word.

From the foregoing description, it should be apparent that the SoC 100 comprises the circuit-supporting substrate 103, and an N-bit DSP, such as DSP 102, disposed on the circuit-supporting substrate. A first bus, such as DSP bus 104, is disposed on the circuit-supporting substrate 103. The first bus includes an N-bit wide data bus coupled to the N-bit DSP. At least one peripheral, including at least one M×N-bit-only peripheral, such as 32-bit-only peripheral 110, is disposed on the circuit-supporting substrate 103. A second bus, such as IP bus 106, is disposed on the circuit-supporting substrate 103. The second bus includes an M×N bit wide data bus coupled to the at least one M×N-bit-only peripheral. The bridge 108 is disposed on the circuit-supporting substrate 103. The bridge 108 couples the first bus to the second bus. The bridge 108 includes the write merge system 200. The write merge system 200 includes first logic circuits for receiving N-bit wide data and a write transaction from the N-bit DSP. The write transaction is for modifying an N-bit word of an M×N-bit word at a data location of the M×N-bit-only peripheral, thereby creating a modified M×N-bit word. The write merge system 200 also includes second logic circuits for writing an M×N-bit word, including the modified N-bit word, to said data location of the M×N-bit-only peripheral.

The merge write system 200 is not limited to use within a SoC, but can be used with any computer system in which the width of the processor data bus is smaller than the width of the peripheral data bus. The invention is not limited to situations where the processor is a DSP, but is applicable to situations using any type of processor.

From the foregoing description, it should be apparent that the write merge system 200, which is part of a computer system, such as the SoC 100, receives a write transaction from a two-cycle assess processor, such as the DSP 102. As is well known to persons of ordinary skill in the art, a write transaction occurs as a result of the DSP 102 being programmed with a write instruction. The write transaction is for modifying a 16-bit word of a 32-bit location of the 32-bit-only peripheral 110 with a new 16-bit word. The write transaction, which includes a 7-bit address, advantageously uses only two (2) clock cycles of the processor. The 32-bit-only peripheral 110 has a 12-bit address. The write merge system 200 performs the following steps in response to receiving the write transaction. Prior to running peripheral access cycles, and as part of initialization, the processor pre-stores in the memory map 220 addresses ranges that correspond to the addresses of all the peripherals of the computer system. The write merge system 200 determines whether the address is a mergeable address of a peripheral. The write merge system 200 forms a 12-bit address from the 7-bit address and from the memory map 220. The write merge system 200 reads a 32-bit word from the 32-bit-only peripheral 110, which includes the 16-bit word being modified. The write merge system 200 merges the new 16-bit word with the 32-bit word read in the previous step to create a modified 32-bit word. The write merge system 200 writes the modified 32-bit word to the 32-bit-only peripheral 110.

The invention is not limited to situations where the 16-bit DSP 102 needs to perform write accesses to modify 16-bit locations of 32-bit-only peripherals, but can be extended equally as well to situations where an N-bit DSP needs to perform write accesses to modify N-bit locations of a 2N-bit peripheral. Furthermore, the invention is not limited to situations where the N-bit DSP needs to perform write accesses to modify N-bit locations of the 2N-bit peripheral, but can be extended equally as well to situations where the N-bit DSP needs to perform write accesses to modify N-bit locations of an M×N-bit peripheral. The write merge system 200 in accordance with the invention accommodates a processor-peripheral data width mismatch, in which the peripheral has a larger data width than has the processor.

The invention is not limited to situations where the addresses used by the 16-bit DSP have an address width of seven (7) bits, but can be extended equally as well to situations where the addresses used by an N-bit DSP have an address width of P bits. The invention is not limited to situations where the addresses used by the 32-bit-only peripheral have an address width of twelve (12) bits, but can be extended equally as well to situations where the addresses used by an M×N-bit-only peripheral have an address width of Q bits. Preferably, Q is larger than P. Alternatively, Q is equal to P. As a second alternative, Q is smaller than P.

From the foregoing description, it should be apparent that the write merge system 200 bridges a DSP bus 104 to an IP bus 106. The DSP bus 104 includes a DSP data bus of N-bit width and a DSP address bus of P-bit width. The IP bus 106 includes an IP data bus of M×N-bit width and an IP address bus of Q-bit width. The write merge system 200 includes: an address receiving means for receiving an address of P-bit width from the DSP bus 104; a data means for receiving new data of N-bit width from the DSP bus; a converting means for converting the address of P-width to a modified address of Q-bit width; a reading means for reading old data of M×N bit width from the IP bus 106; a merging means for merging the received new data of N-bit width with the read old data of M×N-bit width to create a modified data of M×N-bit width; and a writing means for writing to the IP bus the modified address of Q-bit width and the modified data of M×N-bit width.

In the exemplary embodiment, the address receiving means includes the slave state machine 240 and the address queue 222. In the exemplary embodiment, the data receiving means includes the slave state machine 240 and the write data queue 224. In the exemplary embodiment, the converting means includes the snoop state machine 242, the memory map 220, the window select registers 221, the merge bit and word select bit queue 226 and the IP address buffer 228. In the exemplary embodiment, the reading means includes the read state machine 244, the high read data queue 230 and low read data queues 232. In the exemplary embodiment, the writing means includes the write state machine 246, and the merging means includes the multiplexers 234 and 236. However, from the description of the invention, it should be clear to a person of ordinary skill in the art that the address receiving means, the data receiving means, the converting means, the reading means and the writing means are not limited to the structures described in the exemplary embodiment, but may instead include other structures.

With the write merge system 200, when only sixteen (16) bits are being modified, each write access to the 32-bit-only peripheral 110, advantageously requires merely two (2) clock cycles of the two-cycle access DSP 102, one clock cycle for a read address phase and one clock cycle for a read data phase. For example, assuming that the 16-bit two-cycle access DSP 102 writes to the 32-bit-only peripheral 110 in order to modify the high sixteen (16) bits of a 32-bit address, such as address "1", the following advantageously small number of bus operations would to be needed: a) the DSP bus performs a 16-bit write to address "1" and is then advantageously free to perform other unrelated tasks; b) the bridge 108 performs a 32-bit read at address "0"; and c) the bridge 108 performs a 32-bit write at address "0". By the term "bus operation" it is meant an operation that involves a bus and that occurs externally to both the DSP 102 and the write merge system 200, and does not include operations that occur only within the DSP or only within the write merge system. The invention is not limited to use with a two-cycle access DSP 102. Proportionate advantages are gained when using the invention with other types of processors, for example, a one-cycle access DSP or a four-cycle access DSP.

The advantages of the write merge system 200 may include a) an increase in the performance of the DSP 102; b) a reduced write workload for the DSP; c) an increase of available million instructions per second for other application tasks; d) reduced instruction read-only memory for control firmware; and e) reduced current consumption for the integrated circuit of the DSP. More specifically, using the write merge system 200 may result in a reduction by 75% of the current consumption, and a reduction by 75% of instruction memory required to support multiple accesses for a single peripheral write task.

The architecture of the bridge 108 may allow a person programming the DSP 102 to use a single 16-bit input/output write instruction to modify sixteen (16) bits of a 32-bit register within the 32-bit-only peripheral 110. The advantages of the architecture of the bridge 108 may include a reduction of code size, and the capability of using the 32-bit-only peripheral 110 within the confines of a 16-bit DSP architecture.

The preferred embodiment of the write merge system 200 uses a system of address and data write queues, address snooping and data merging as elements to accomplish its primary function. The invention performs merging of data from the DSP 102 to a peripheral for locations predetermined by address merge mapping, and performs the read and merged write accesses based on the snoop results of the address of the peripheral.

While the principles of the invention have been described above in connection with specific apparatus, it is to be clearly understood that this description is made only by way of example and not as a limitation on the scope of the invention.

We claim:

1. A computer system, comprising:
   an N-bit Digital Signal Processor (DSP) that generates an N-bit write transaction for modifying an N-bit word at an 2×N-bit data location of an N-bit peripheral;
   a first bus including an N-bit wide data bus, coupled to the N-bit DSP;
   at least one peripheral including a 2×N-bit-only peripheral, the 2×N-bit-only peripheral having data locations, each data location having a width of 2×N bits, the 2×N-bit-only peripheral being incapable of accepting any N-bit write transactions;
   a second bus including a 2×N bit wide data bus, coupled to the 2×N-bit-only peripheral; and
   a bridge coupled between the first bus and the second bus, the bridge including a write merge system, the write merge system including:
      first logic circuits for receiving new N-bit wide data and for receiving an N-bit write transaction from the N-bit DSP, the N-bit write transaction being for modifying an N-bit word of a 2×N-bit word at a 2×N-bit data location of the 2×N-bit-only peripheral, and second logic circuits for writing a 2×N-bit word to said 2×N-bit data location of the 2×N-bit-only peripheral, the 2×N-bit word including said N-bit word modified by the new N-bit wide data, in which the second logic circuits perform a single write of 2×N bits that changes only said N-bit word that was being modified by the N-bit write transaction.

2. The computer system of claim 1, in which the write merge system writes the 2×N-bit word to said 2×N-bit data location of the 2×N-bit-only peripheral without any software intervention by the N-bit DSP subsequent to receiving said write transaction.

3. The computer system of claim 1, in which the write merge system includes a memory map in which is pre-stored address ranges of peripherals, and window select registers in which are pre-stored most significant bits associated with each address range.

4. The computer system of claim 3, in which the write transaction includes a P-bit wide address, and in which said data location of the 2×N-bit-only peripheral has a Q-bit wide address, and in which the first logic circuits produce a Q-bit wide address from the P-bit wide address, from the memory map, and from the window select registers.

5. The computer system of claim 1, including a circuit-supporting substrate and in which the computer system is a System-on-Chip, and in which the DSP, at least a portion of the first bus, at least a portion of the second bus, the bridge, and the at least one peripheral are disposed on the circuit-supporting substrate.

6. The computer system of claim 1, in which the first logic circuits read the 2×N-bit word from the 2×N-bit-only peripheral, and in which the 2×N-bit word that was read includes the N-bit word being modified as a result of the N-bit write transaction from the N-bit DSP.

7. The computer system of claim 6, in which the second logic circuits include
a read state machine,
a high read data queue coupled to the read state machine,
a low read data queue coupled to the read state machine,
at least one multiplexer coupled to the read state machine, and
a write state machine coupled to the at least one multiplexer.

8. The computer system of claim 7, in which the 2×N-bit word that was read includes a high N-bit word and a low N-bit word, and in which the high N-bit word is stored in the high read data queue and the low N-bit word is stored in the low read data queue.

9. The computer system of claim 8, in which the 2×N-bit word that was read is a 32-bit word and includes a high 16-bit word and a low 16-bit word, and in which the high 16-bit word is stored in the high read data queue and the low 16-bit word is stored in the low read data queue.

10. The computer system of claim 7, in which the at least one multiplexer merges the new N-bit wide data with the 2×N-bit word that was read, to form a modified 2×N-bit word at an output of the at least one multiplexer.

11. The computer system of claim 10, in which the second logic circuits write the modified 2×N-bit word to said data location of the 2×N-bit-only peripheral from a single N-bit DSP write transaction.

12. The computer system of claim 1, in which the single write of 2×N bits performed by the second logic circuits does not change the other N-bit word of the 2×N-bit word at said 2×N-bit data location of the 2×N-bit peripheral.

13. A write merge system for bridging a first bus including a first data bus of N-bit width and a first address bus of P-bit width with a second bus including a second data bus of M×N-bit width, where M is greater than or equal to 2, and a second address bus of Q-bit width, comprising:
means for receiving an address of P-bit width from the first bus;
means for receiving new data of N-bit width from the first bus;
means for convening the address of P-width to a modified address of Q-bit width;
means for reading old data of M×N bit width from the second bus;
means for merging the received new data of N-bit width with the read old data of M×N-bit width to create a modified data of M×N-bit width; and
means for writing to the second bus the modified address of Q-bit width and the modified data of M×N-bit width.

14. The write merge system of claim 13, including an N-bit processor coupled to the first data bus and at least one M×N-bit-only peripheral coupled to the second data bus.

15. The write merge system of claim 14, in which the M×N-bit-only peripheral has an address of Q-bit width, where Q>P.

16. In a computer system, including a two-cycle access N-bit processor, at least one M×N-bit-only peripheral and a write merge system coupled to the two-cycle access N-bit processor and to the at least one M×N-bit-only peripheral, a method of modifying a N-bit word of a M×N-bit data location of the M×N-bit-only peripheral using only two clock cycles of the two-cycle access N-bit processor, comprising the following steps performed at the merge write system:
a) pre-storing a memory map of addresses of peripherals;
b) receiving during a first clock cycle of a two-cycle access N-bit processor, a write transaction, including a P-bit address, to modify a N-bit word of a M×N-bit data location of a M×N-bit-only peripheral with a new N-bit word;
c) receiving during a second clock cycle of the two-cycle access N-bit processor, data for the new N-bit word;
d) forming a Q-bit address from the P-bit address and from the memory map;
e) reading a M×N-bit word from the M×N-bit data location of the M×N-bit-only peripheral;
f) merging the new N-bit word with the M×N-bit word read in step e, to create a modified M×N-bit word; and
g) writing the modified M×N-bit word to the M×N-bit data location of the M×N-bit-only peripheral.

17. The method of claim 16, in which N=16.

18. The method of claim 16, in which M=2.

19. The method of claim 16, in which P<Q.

20. The method of claim 19, in which P=7 and Q=12.

* * * * *

UNITED STATES PATENT AND TRADEMARK OFFICE
CERTIFICATE OF CORRECTION

PATENT NO. : 7,376,777 B2  Page 1 of 1
APPLICATION NO. : 11/233915
DATED : May 20, 2008
INVENTOR(S) : Clarence K. (Kevin) Coffee It is certified that error appears in the above-identified patent and that said Letters Patent is hereby corrected as shown below:

In Column 14, Line 15, Claim No. 13:
Change "means for convening the address of P-width to a modified" to --means for converting the address of P-width to a modified--

Signed and Sealed this

Thirtieth Day of September, 2008

JON W. DUDAS
*Director of the United States Patent and Trademark Office*